(12) United States Patent
Fischer

(10) Patent No.: US 12,269,415 B2
(45) Date of Patent: Apr. 8, 2025

(54) AIRBAG FABRIC

(71) Applicant: ZF AUTOMOTIVE GERMANY GMBH, Alfdorf (DE)

(72) Inventor: Anton Fischer, Schechingen-Leinweiler (DE)

(73) Assignee: ZF AUTOMOTIVE GERMANY GMBH, Alfdorf (DE)

(*) Notice: Subject to any disclaimer, the term of this patent is extended or adjusted under 35 U.S.C. 154(b) by 0 days.

(21) Appl. No.: 18/253,943

(22) PCT Filed: Nov. 18, 2021

(86) PCT No.: PCT/EP2021/082185
§ 371 (c)(1),
(2) Date: May 23, 2023

(87) PCT Pub. No.: WO2022/112098
PCT Pub. Date: Jun. 2, 2022

(65) Prior Publication Data
US 2024/0092306 A1    Mar. 21, 2024

(30) Foreign Application Priority Data

Nov. 25, 2020 (DE) ...................... 10 2020 131 168.0
Jul. 15, 2021 (DE) ...................... 10 2021 118 314.6

(51) Int. Cl.
B60R 21/235   (2006.01)
D03D 1/02     (2006.01)
D03D 13/00    (2006.01)

(52) U.S. Cl.
CPC ............. B60R 21/235 (2013.01); D03D 1/02 (2013.01); D03D 13/008 (2013.01);
(Continued)

(58) Field of Classification Search
CPC .... D10B 2505/124; B60R 2021/23509; B60R 21/235; B60R 2021/23547; B60R 2021/23542; D03D 13/008; D03D 1/02
See application file for complete search history.

(56) References Cited

U.S. PATENT DOCUMENTS 5,131,434 A * 7/1992 Krummheuer ........ B60R 21/235
139/389
5,336,538 A * 8/1994 Kitamura .............. B60R 21/235
139/389
(Continued)

FOREIGN PATENT DOCUMENTS

CA      2064693 A1 * 12/1991
CN    107829199 A  *  3/2018 .............. D02G 3/04
(Continued)

OTHER PUBLICATIONS

JP2003205817A machine translation from espacenet.com (Year: 2024).*
(Continued)

Primary Examiner — Paul N Dickson
Assistant Examiner — Maxwell L Meshaka
(74) Attorney, Agent, or Firm — Tarolli, Sundheim, Covell & Tummino LLP

(57) ABSTRACT

An airbag fabric for an airbag comprises a mounting area (22) for mounting the airbag. The mounting area (22) includes a mounting hole (24), a load portion (26) which is adjacent to the mounting hole (24) in a load direction (B), and a transition portion (28) which is adjacent to the mounting hole (24) against the load direction (B). Furthermore, the load portion (26) and the transition portion (28) include different weaves. The fabric in the load portion (26) exhibits lower resistance to displacement than in the transition portion (28) so that a fiber bead forms of the fabric fibers of the load portion (26), which fiber bead is adjacent
(Continued)

to the mounting hole (24) in the load direction (B), if bearing stress acts upon the mounting hole (24) in the load direction (B).

27 Claims, 6 Drawing Sheets

(52) U.S. Cl.
CPC .............. *B60R 2021/23509* (2013.01); *B60R 2021/23542* (2013.01); *B60R 2021/23547* (2013.01); *D10B 2505/124* (2013.01)

(56) References Cited

U.S. PATENT DOCUMENTS

| | | | | |
|---|---|---|---|---|
| 5,707,711 | A * | 1/1998 | Kitamura | D03D 11/02 |
| | | | | 428/36.1 |
| 9,475,255 | B2 * | 10/2016 | Lowe | B32B 7/14 |
| 11,052,863 | B2 * | 7/2021 | Gould | B60R 21/239 |
| 11,293,122 | B2 * | 4/2022 | Mori | D03D 13/008 |
| 11,618,982 | B2 * | 4/2023 | Albiez | D03D 11/00 |
| | | | | 139/389 |
| 2001/0048219 | A1 | 12/2001 | Heigl | |
| 2008/0079243 | A1 | 4/2008 | Kino et al. | |
| 2014/0183848 | A1 | 7/2014 | Aranzulla et al. | |
| 2015/0266264 | A1 * | 9/2015 | Lowe | B32B 5/26 |
| | | | | 156/278 |
| 2019/0322238 | A1 * | 10/2019 | Gould | B60R 21/2338 |
| 2019/0345650 | A1 * | 11/2019 | Mori | D03D 1/02 |
| 2021/0140074 | A1 * | 5/2021 | Yoshida | D03D 15/283 |
| 2021/0301430 | A1 * | 9/2021 | Albiez | D03D 13/004 |
| 2022/0001830 | A1 * | 1/2022 | Fischer | B60R 21/231 |
| 2023/0067893 | A1 * | 3/2023 | Stegmeier | B60R 21/203 |
| 2024/0042958 | A1 * | 2/2024 | Ressencourt | B60R 21/235 |

FOREIGN PATENT DOCUMENTS

| | | | | |
|---|---|---|---|---|
| DE | 112004000482 T5 | | 5/2006 | |
| GB | 2251410 A | * | 7/1992 | ............. B29C 65/02 |
| GB | 2386870 A | * | 10/2003 | ........... B60R 21/231 |
| JP | 07205736 A | * | 8/1995 | |
| JP | 09175301 A | * | 7/1997 | |
| JP | 2666580 B2 | * | 10/1997 | |
| JP | 2007045418 A | | 2/2007 | |
| JP | 3941514 B2 | * | 7/2007 | |
| JP | 2010030342 A | * | 2/2010 | |
| WO | WO-9009295 A2 | * | 8/1990 | |
| WO | 2003/078711 A1 | | 9/2003 | |
| WO | 2005/075258 A1 | | 8/2005 | |
| WO | 2008/105693 A1 | | 9/2008 | |
| WO | 2013/013767 A1 | | 1/2013 | |
| WO | WO-2019215092 A1 | * | 11/2019 | ........... B60R 21/232 |

OTHER PUBLICATIONS

PCT Search REport for corresponding International Application Serial No. PCT/EP2021/082185, mailed Mar. 4, 2022, pp. 1-5.

* cited by examiner

AIRBAG FABRIC

RELATED APPLICATIONS

This application is a U.S. National Stage Application filed under 35 USC 371, claiming priority to Serial No. PCT/EP2021/082185, filed on 18 Nov. 2021; which claims priority from German Patent Application DE 10 2020 131 168.0, filed 25 Nov. 2020, and German Patent Application DE 10 2021 118 314.6, filed 15 Jul. 2021, the entireties of which are hereby incorporated herein by reference.

TECHNICAL FIELD

The invention relates to an airbag fabric for an airbag comprising a mounting area for mounting the airbag.

BACKGROUND

Airbag fabrics for airbags are known.

It is further known to design those airbag fabrics with mounting areas by means of which a corresponding airbag is mounted in a steering wheel or on a roof frame, for example, in the case of a head side airbag and is restrained when it is inflated. When the airbag is released in such a way, the mounting areas are strongly loaded in a defined direction and, therefore, must be designed to be particularly tear-proof. In order to ensure specifically high tearing strength in said area, said mounting areas are frequently reinforced by means of additional fabric layers or metal fittings.

Those reinforcements have the drawbacks that the manufacture of the airbag fabric involves great effort and the airbags thus become more voluminous.

SUMMARY

It is the object of the invention to provide an airbag fabric for an airbag having a mounting area which meets particularly high requirements to the tearing strength and has a simple design.

For achieving the object, an airbag fabric for an airbag having a mounting area for mounting the airbag is provided. The mounting area includes a mounting hole, a load portion adjacent to the mounting hole in a load direction and a transition portion adjacent to the mounting hole against the load direction. The load portion and the transition portion have different weaves. Accordingly, the fabric and, resp., the weave in the load portion exhibits lower resistance to displacement than in the transition portion so that a fiber bead forms of the fabric fibers of the load portion, the fiber bead being adjacent to the mounting hole in the load direction, if bearing stress acts upon the mounting hole in the load direction.

As an alternative, to achieve the object, an airbag fabric for an airbag having a mounting area for mounting the airbag is provided, the mounting area including a mounting hole which is disposed in a load portion, and a transition portion. The transition portion is directly or indirectly adjacent to the load portion in the direction of an edge of the chamber of the airbag. In the alternative solution, too, the fabric and the weave, respectively, exhibits lower resistance to displacement in the load portion than in the transition portion so that a fiber bead can form of the fabric fibers of the area of the load portion which is adjacent to the mounting hole in the load direction, if bearing stress acts upon the mounting hole in the load direction. In such embodiment, the mounting hole is disposed preferably completely in the load portion and is completely surrounded by the load portion. The alternative solution can help achieve, specifically for large airbags, that admissible tolerances in the cutting can be simply compensated.

In accordance with the application, the term "weave" designates the fabric weave, i.e., the system by which the warp threads are crossed with the at least one weft thread to form the fabric. Further, the resistance to displacement designates the resistance that has to be overcome so as to displace the threads of the fabric relative to each other.

In the state of the art, the mounting areas are formed with weaves which exhibit a specifically high resistance to displacement and, thus, maintain their structure even under high loads.

It was found that a defined reduction of the resistance to displacement in the portion upon which the bearing stress acts in the case of restraint helps provide a mounting area which exhibits increased breaking strength. This results from a fiber bead which forms by the displacement of the fabric threads relative to each other and which offers a larger contact face to which a fastener which extends through the mounting hole and via which the bearing stress acts into the fabric can be adjacent. The larger contact face reduces the pressure acting upon the mounting area in the load direction with a given force, causing the mounting area to absorb higher load before it tears or breaks. In other words, by the displacement of the fabric threads to form a fiber bead, a larger number of fabric threads simultaneously contact the fastener and, thus, constitute a higher resistance that must be overcome to break through the fabric than this would be the case, if the fabric included the same weave as the transition area.

Consequently, a local weakening in the form of the reduced resistance to displacement of the load portion results in a mounting area which can generally absorb higher load.

Specifically, the Load Portion May be Designed without any Separate Fabric Layers or Metal Fittings in this Case.

In one embodiment, the weave of the load portion has a first knot density and the transition portion includes a weave having a second knot density. The first knot density is lower than the second knot density. The knot density defines the number of knots per surface area of fabric. In accordance with the application, knots are points where warp threads cross weft threads. In particular, a point where two or more warp and/or weft threads extending in parallel cross, as this is the case with the Panama weave, for example, is considered to be a single knot irrespective of the number of the threads crossing at that point. Due to the reduced number of knots, the weave of the load portion has a lower resistance to displacement than the weave of the transition portion.

Accordingly, the first knot density may be not more than 50%, specifically not more than 34%, of the second knot density, causing a particularly effective fiber bead forming under load.

In another embodiment, the fabric of the load portion has a tear propagation resistance that is at least 150%, specifically at least 200%, of the tear propagation resistance of the fabric of the transition portion so that an effective fiber bead forms reliably under load.

It is advantageous when the warp threads of the weave of the load portion extend perpendicularly or in parallel to the load direction. In this way, either the warp threads or the weft threads extend perpendicularly to the load direction and, thus, can be displaced particularly effectively into a fiber bead.

According to one embodiment, the weave of the load portion is a Panama weave which, due to its system, has a particularly low knot density.

In accordance with another embodiment, the transition portion merges into an airbag chamber portion that forms a wall of an inflatable chamber. As a result, the mounting area is integrally connected to the airbag chamber portion. Thus, the airbag has a particularly high structural strength.

The airbag fabric may be provided to be a one-piece-woven (OPW) fabric in which the threads of opposed walls of an inflatable chamber merge into a joint weave at the edge. This means that the whole airbag fabric is integrally formed and, in this way, has a particularly simple design.

Further, an edge portion may be adjacent to the outside of the load portion. The edge portion along with the transition portion surrounds the load portion frame-like, and the edge portion and the transition portion include the same weave. In this way, the load portion is enclosed or encompassed by a fabric having higher resistance to displacement which stabilizes the load portion in the border area. This offers the advantage that the fiber bead forms in a defined manner and provides high resistance in the load direction.

In one embodiment, the load portion is formed to be multi-layer, specifically two-layer or three-layer. The threads of the layers in this case merge integrally into the weave of the transition portion. If an edge portion surrounds the load portion, the threads of the layers further merge integrally into the single-layer weave of the edge portion. The multi-layer design of the load portion helps form a fiber bead in each layer, allowing the mounting area to absorb higher load. In addition, in this integral design, the warp threads of the transition portion in this area are divided to the layers. Due to the reduced number of warp threads per layer, each layer can be designed particularly simply with one weave having a reduced knot density and resistance to displacement, respectively, as compared to the transition portion.

Moreover, the load portion may have a basic shape which tapers in the load direction, specifically in the form of a trapezoid, triangle or circular segment. In accordance with the application, the base designates the shape of the load portion without a mounting hole. This means that in embodiments in which the mounting hole overlaps the base of the load portion the overlapping area is added to the shape of the load portion. This design offers the advantage that a wide fiber forms in the wide area of the load portion facing the mounting hole, while the narrowing of the load portion in the load direction supports the fiber bead effectively against the load direction. Thus, the breaking strength of the mounting area is effectively increased.

In one embodiment, the load portion defines over a peripheral angle of at least 60° the edge of the mounting hole, thus allowing a fastener extending through the mounting hole to be directly adjacent to the load portion over a large area in the peripheral direction. This ensures an effective fiber bead to form, specifically even if the actual direction in which a bearing stress acts upon the mounting hole is different from the intended load direction.

In one embodiment of the airbag fabric in which the mounting hole of the mounting area is completely surrounded by the load portion, moreover a cushioning portion adjacent to the load portion may be provided.

The cushioning portion is preferably adjacent to the load portion at least in the load direction. Alternatively, or additionally, the cushioning portion can be adjacent to plural sides of the load area specifically in mounting areas which constitute a tensioning strap or tether.

The cushioning portion has a third knot density. The third knot density may be higher than or equal to the second knot density. In typical embodiments, the cushioning portion has a single-layer design and the first knot density amounts to not more than 50% of the third knot density. In preferred embodiments, the first knot density may range from 5% to 34% of the third knot density.

Combing out of the fiber bead which is formed under load can be easily prevented by the cushioning portion.

In order to be able to design the cushioning portion having the very high knot density in an as small and simple manner as possible, a tolerance portion having an inexpensive weave may be adjacent to the cushioning portion.

As an alternative, the cushioning portion may be interposed between the load portion and the transition portion and may be adjacent to the transition portion. In addition, the cushioning portion may be provided to form at least partially the transition portion and to be adjacent to the walls of the airbag which form the fillable chamber of the airbag.

BRIEF DESCRIPTION OF THE DRAWINGS

Further advantages and features will be evident from the following description and from the attached drawings, wherein.

DRAWINGS

Figure 1:
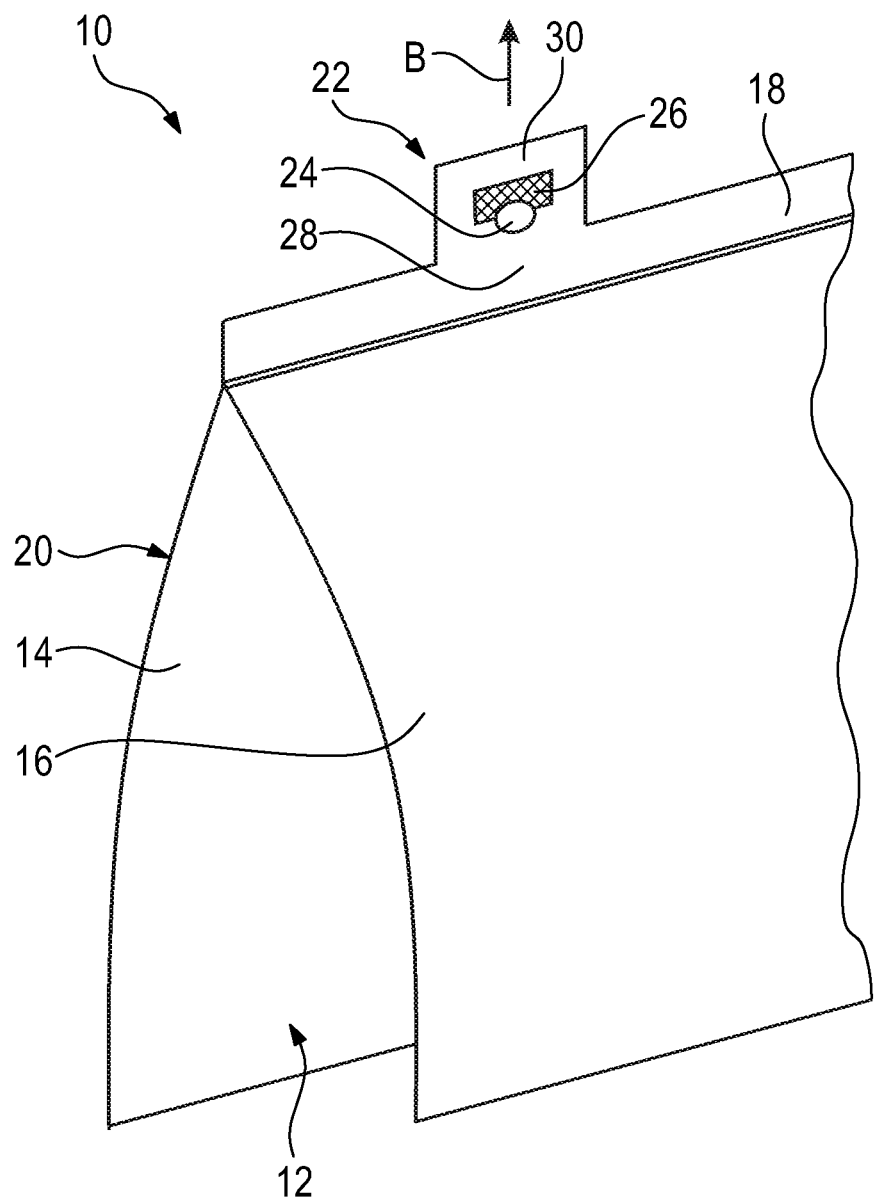
FIG. 1 shows a schematic section view of a part of an airbag having an airbag fabric according to the invention.

FIG. 1 illustrates an airbag 10 that is formed of an airbag fabric 20.

The airbag 10 comprises an inflatable chamber 12 that is delimited by walls 14, 16 facing each other as well as an edge 18 having a mounting area 22.

As a matter of course, the airbag 10 may have any number of mounting areas 22.

In the shown embodiment, the airbag 10 is a one-piece-woven (OPW) airbag. That is, the airbag fabric 20 is a piece of OPW fabric manufactured by a weaving process, also referred to as OPW process.

The two walls 14, 16 form two layers woven in parallel whose threads are grouped, i.e., run, into a joint weave in the edge 18. Thus, the edge 18 comprises a double thread count, while each of the walls 14, 16 has a single thread count.

The tongue-shaped mounting area 22 is provided for mounting the airbag 10 using fasteners (not shown), the airbag 10 being restrained during inflation into a load direction B.

Figure 2:
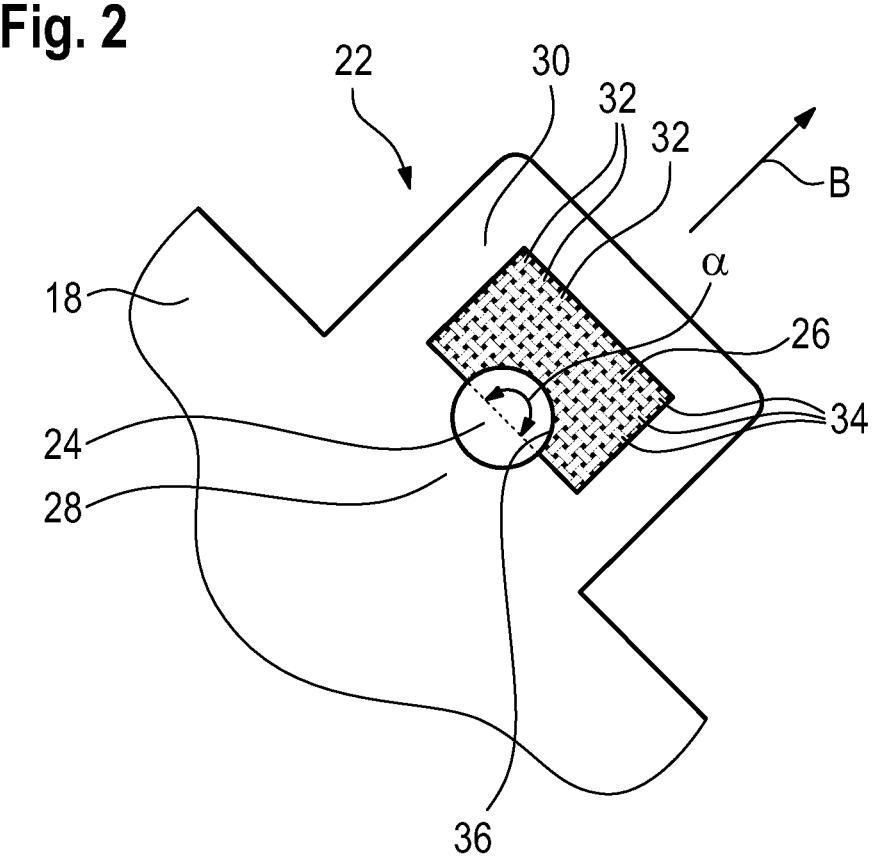
FIG. 2 shows a detail view of a mounting area of the airbag fabric of FIG. 1, FIGS. 3 to 5 show in respective detail views further embodiments of a mounting area of the airbag fabric of FIG. 1.

As shown in FIG. 2, the mounting area 22 has a mounting hole 24 and a load portion 26 which extends away from the mounting hole 24 in the load direction B, and a transition portion 28 which extends against the load direction B from the mounting hole 24 and the load portion 26 to the inflatable chamber 12. The load portion 26 and the transition portion 28 together surround and define the mounting hole 24.

In this case, the transition portion 28 merges integrally into the edge 18 and then into the walls 14, 16.

Furthermore, the mounting area 22 includes an edge portion 30 which, jointly with the transition portion 28, surrounds the load portion 26 frame-like in the form of a closed peripheral frame.

The transition portion 28 and the edge portion 30 have the same weave.

In an alternative embodiment, the weave of the edge portion 30 may be different from the weave of the transition portion 28.

The weave of the transition portion 28 and of the edge portion 30, respectively, is a weave having high resistance to displacement, such as a plain weave in which each of a warp thread and a weft thread cross in a knot and which therefore is referred to as (1/1) weave.

The load portion 26 has a weave which exhibits lower resistance to displacement as compared to the weave of the transition portion 28.

In the present embodiment, the load portion 26 is formed by two superimposed fabric layers having a (2/2) Panama weave, i.e., a weave in which each of two warp threads and two weft threads cross in a knot and, thus, form a checkerboard pattern each field of which has a width of two warp threads and, resp., two weft threads. Each of said fields forms a knot.

The threads of the superimposed fabric layers of the load portion 26 merge integrally into the single-layer woven transition portion 28 and the single-layer woven edge portion 30 and each has half the thread count of the transition portion 28 and, resp., the edge portion 30 in the corresponding area. As a result, the mounting area 22 is configured as a piece of OPW fabric and, thus, has a particularly simple design.

Due to this design with two layers and a (2/2) Panama weave, the knot density of the weave of each fabric layer of the load portion 26 in this case amounts to ⅛ of the knot density of the plain weave of the transition portion 28 and, resp., of the edge portion 30 which have a single-layer design.

Basically, the load portion 26 may have any design as long as it exhibits lower resistance to displacement than the transition portion 28.

For example, the load portion 26 may include any number of fabric layers, specifically one single fabric layer or three or more fabric layers.

In addition, or as an alternative, the load portion 26 and, resp., each fabric layer of the load portion 26 may include any weave, specifically a (2/2) Panama weave or a (3/3) Panama weave.

Figure 6:
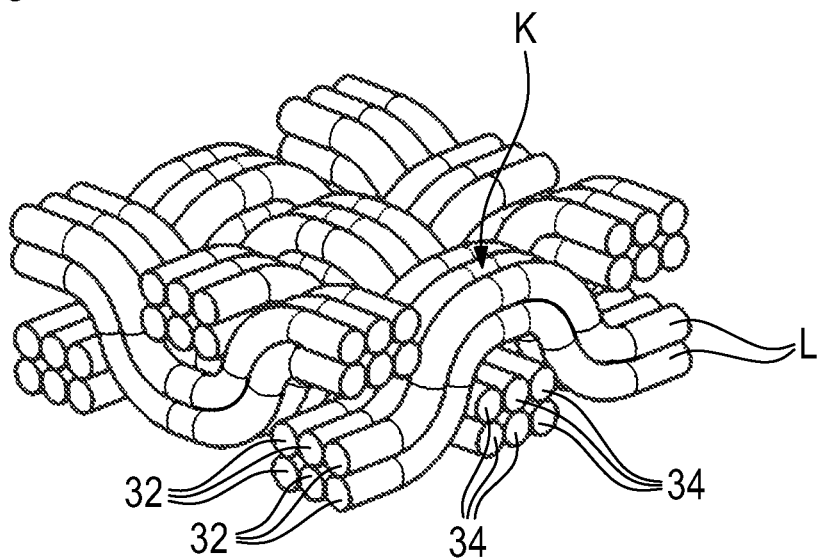
FIG. 6 shows a schematic section view of a (6/6) Panama weave.

In one embodiment, the load portion 26 includes one single fabric layer formed by a (6/6) Panama weave (see FIG. 6), i.e., a weave in which six warp threads 32 cross six weft threads 34 in a knot K. In the shown embodiment, each of the six warp threads 32 and six weft threads 34 extend in a respective double layer having three warp threads 32 and three weft threads 34 for each layer L. Consequently, said (6/6) Panama weave forms a checkerboard pattern each field of which has a width of three warp threads 32 and three weft threads 34, respectively. Each of said fields forms a knot K.

In embodiments comprising a load portion 26 with a single fabric layer, the threads of the load portion 26 preferably merge, as in the case of a load portion 26 with plural superimposed fabric layers, integrally into the single-layer woven transition portion 28 and the single-layer woven edge portion 30. Thus, each of the load portion 26, the transition portion 28 and the edge portion 30 is single-layered and has the same thread count. The load portion 26 differs from the transition portion 28 and the edge portion 30 by the type of its weave which exhibits lower resistance to displacement and specifically lower knot density than the weave of the transition portion 28 and the edge portion 30. In this way, the mounting area 22 may be configured as a piece of OPW fabric and may have a particularly simple design.

Preferably, the knot density of the weave of the load portion 26 and of each fabric layer of the load portion 26, respectively, amounts to not more than half, specifically to not more than ⅓, of the knot density of the weave of the transition portion 28.

Furthermore, it is of advantage when the load portion 26 exhibits tear propagation resistance which is higher by at least half than the tear propagation resistance of the transition portion 28. Preferably, the tear propagation resistance of the load portion is at least twice as high as the tear propagation resistance of the transition portion 28.

Basically, the mounting area 22 may take any shape and/or any length in the load direction B.

Specifically, in an alternative embodiment, the mounting area 22 can form a tensioning strap 44 or tether which influences a deployment behavior of the airbag 10 during inflation of the airbag 10, for example, and/or in the inflated state of the airbag 10 retains the latter at a desired position. In this case, the transition portion 28 forms a strap-shaped portion extending away from the inflatable chamber 12 particularly in the load direction B. In this way, the mounting area 22 provides the functionality of a tensioning strap 44 or a tether, respectively, so that, e.g., a separate tensioning strap 44 or tether and/or a separate attachment fitting on the tensioning strap 44 or tether is/are not required.

In the embodiment shown in FIG. 2, the warp threads 32 of the load portion 26 extend in parallel to the load direction B, while the weft threads 34 of the load portion 26 extend perpendicularly to the load direction B.

In an alternative embodiment, the weft threads 34 of the load portion 26 extend in parallel to the load direction B, while the warp threads 32 of the load portion 26 extend perpendicularly to the load direction B. This is an option which is not limited to the illustrated embodiments.

Basically, the warp threads 32 and the weft threads 34, respectively, may extend at any angle with the load direction B.

However, it is advantageous when the warp threads 32 or the weft threads 34 extend at an angle with the load direction B that ranges from 60° to 120°, specifically from 80° to 100°, so as to promote the bead formation under load which will be explained below.

The mounting hole 24 has a circular cross-section.

In an alternative embodiment, the mounting hole 24 may have any cross-section.

Further, the mounting hole 24 is arranged so that 50% of its periphery are adjacent to each of the load portion 26 and the transition portion 28. Thus, the load portion 26 defines the edge 36 of the mounting hole 24 over a peripheral angle α of 180°.

As a matter of course, the load portion 26 can be adjacent to the mounting hole 24 over any area or peripheral angle α.

In an alternative embodiment (see FIG. 3), the load portion 26 may be adjacent to the mounting hole 24 over a peripheral angle α of less than 1° only.

Preferably, the load portion 26 is adjacent to the mounting hole 24 over a peripheral angle α ranging from 60° to 180°, however.

In the embodiment illustrated in FIG. 2, the load portion 26 has a rectangular base whose sides extend in parallel and perpendicularly, resp., to the load direction B.

The load portion 26 can basically take any shape and/or any orientation relative to the load direction B.

Figure 3:
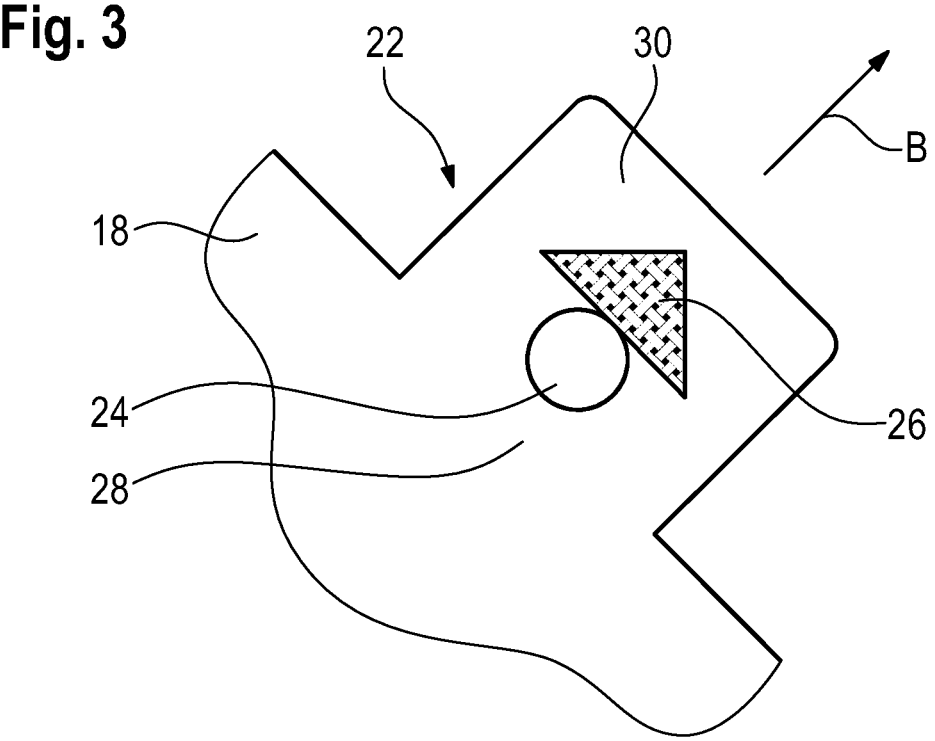
Figure 4:
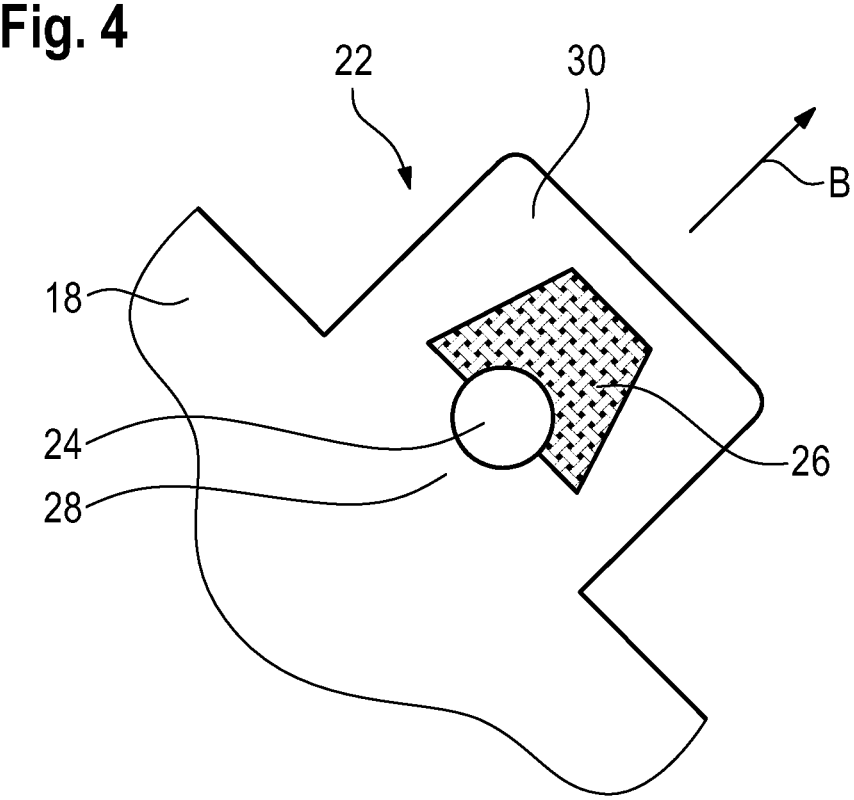
Figure 5:
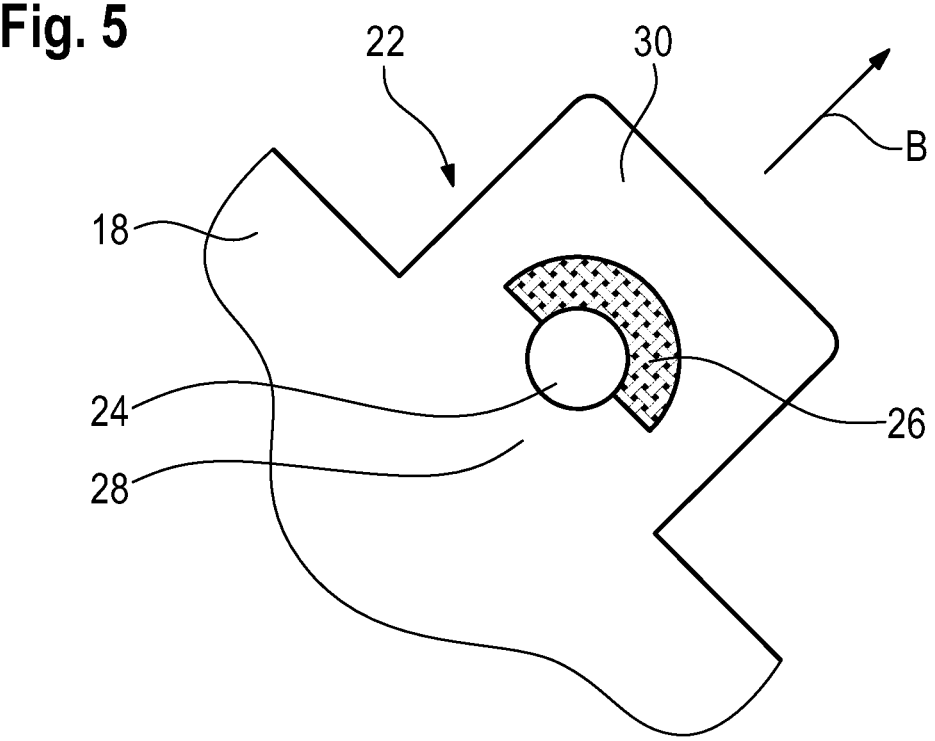

Specifically, the load portion 26 may take a shape which tapers in the load direction B, as shown in FIGS. 3 to 5 which illustrate further embodiments of the airbag fabric 20 having alternatively designed mounting areas 22.

In the embodiment shown in FIG. 3, the load portion 26 has a base in the form of an isosceles triangle.

In the embodiment shown in FIG. 4, the load portion 26 has a trapezoidal base.

In the embodiment shown in FIG. 5, the load portion 26 has a base formed by a semicircle.

In all embodiments, the warp and weft threads 32, 34 are displaced in the load portion 26, if the fastener extending through the mounting hole 24 causes bearing stress to act in the load direction B upon the edge 36 of the mounting hole 24 adjacent to the load portion 26 by.

Unlike the fabric of the transition portion 28 which, due to the higher resistance to displacement, would tear by such bearing stress, the warp and weft threads 32, 34 are pushed together in the load portion 26 by the fastener to form a bead that is composed of the fabric fibers of the warp and weft threads 32, 34.

Said fiber bead forms a resistant barrier which can only be penetrated by a specifically high load.

Measurements made with the embodiment shown in FIG. 2 have resulted in the fact that the mounting area 22 withstands a two times higher load than the mounting area of an airbag fabric that is formed without a load portion 26.

Figure 7:
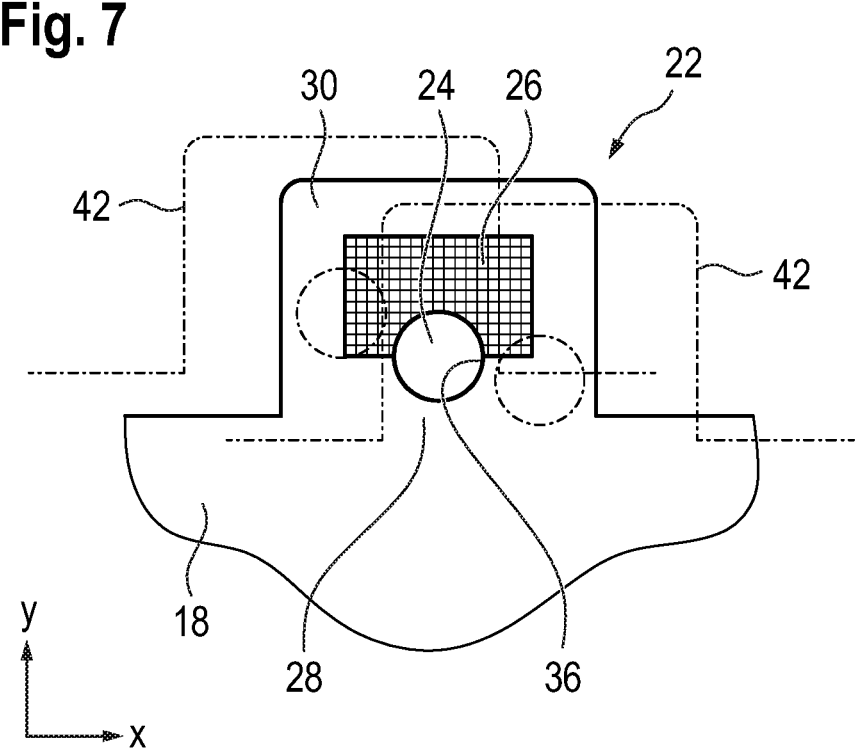
FIG. 7 shows a detail view of a mounting area of the airbag fabric of FIG. 1 with cutting lines lying within a tolerance area.

FIG. 7 illustrates by the laser cutting lines 42 shown as dot-dash line in which area admissible tolerances in the cutting can be located in very large airbags 10, i.e., which are very long in the x direction. Accordingly, as shown in FIG. 7, in particular in those very large airbags 10 there may arise the problem that, due to the admissible tolerances, the mounting hole 24 of the mounting area 22 is not or not sufficiently adjacent to the load portion 26 of a mounting area 22 according to FIGS. 1 to 6.

Figure 8:
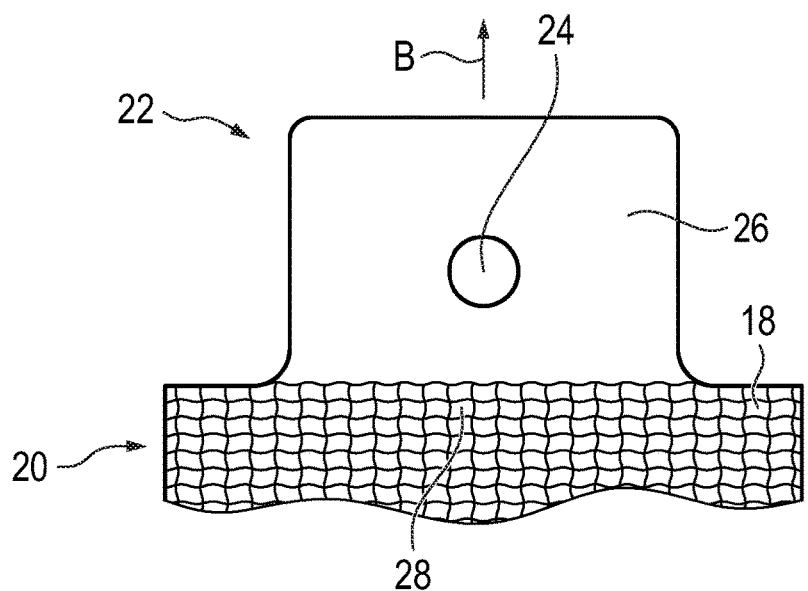
FIG. 8 shows a detail view of another embodiment of a mounting area of the airbag fabric.

By the embodiment of the mounting area 22 shown in FIG. 8, an alternative embodiment of the airbag fabric 20 according to the invention is illustrated in which the mounting hole 24 is completely enclosed by the load portion 26 and the load portion 26 is directly adjacent to the transition area 28 which merges integrally into the edge 18 and then into the walls 14, 16. This alternative embodiment helps achieve that the mounting hole 24 of the mounting area 22 is arranged, even with consideration of the admissible tolerances when cutting the airbag 10, inside the load portion 26 and a fiber bead is formed under load.

The load area 26 in such embodiment is preferably single-layered or two-layered and has a weave which includes as few knots K as possible, but sufficient knots K to prevent combing out as a reason of breakage. In this case, the selection of the weave and, thus, the number of the knots K in the load portion 26 is influenced by the selected coating of the airbag fabric 20, for example.

The type of coating can significantly influence the internal friction in the load portion and, consequently, the selection of the knot density. It has turned out in tests with the mounting area 22 of FIG. 8 that, in airbag fabrics 20 including a silicone coating, load areas 26 which have a (3/3) Panama weave or an even coarser weave for each layer exhibit excellent breaking strength.

Figure 9:
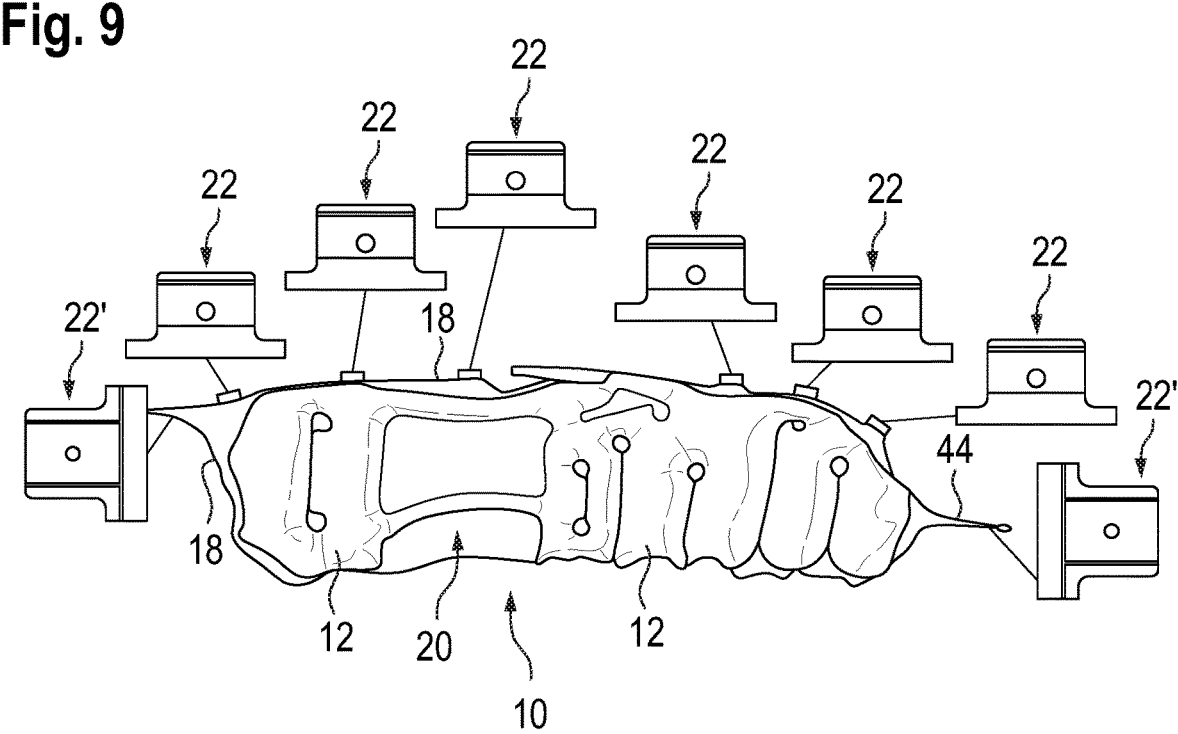
FIG. 9 shows an airbag comprising further embodiments of a mounting area of the airbag fabric.

FIG. 9 illustrates an airbag 10 that includes plural mounting areas 22, 22' according to further embodiments. The mounting areas 22' in FIG. 9 form the tensioning straps 44 of the airbag 10.

As an alternative, the mounting areas 22, 22' of the airbag 10 can also be connected to a tensioning strap 44 in the form of a separate component. The structure of the mounting area for connection of a tensioning strap 44 can correspond, even in such embodiment, to the mounting area 22, 22' of the airbag fabric according to the invention.

Figure 10:
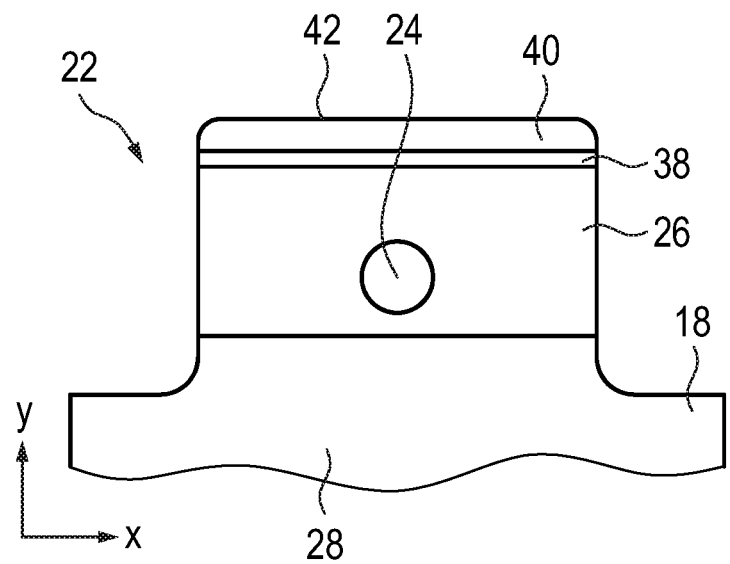
FIGS. 10 and 11 show respective detail views of the mounting areas of the airbag fabric of FIG. 9.
Figure 11:
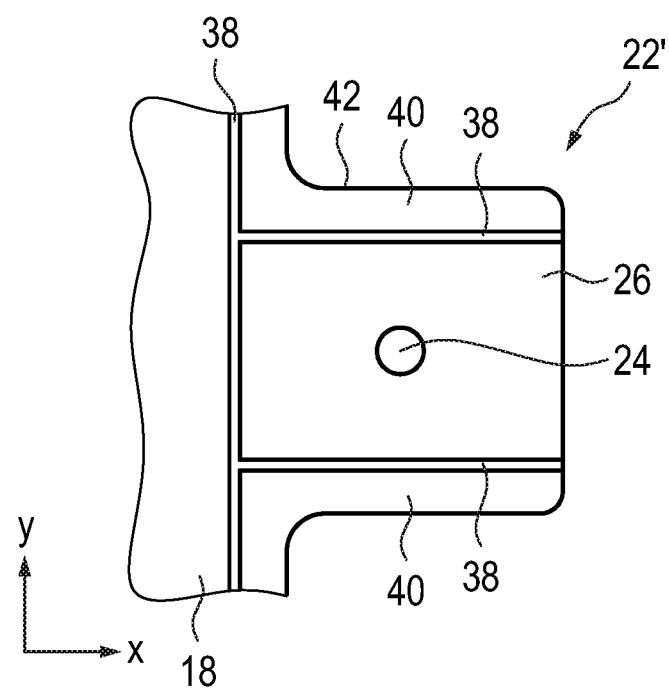

FIGS. 10 and 11 illustrate the mounting areas 22 and 22', resp., in a detail view.

In the embodiments shown in FIGS. 10 and 11, the mounting hole 24 is also completely surrounded by the load portion 26. In addition, the mounting portion 22 and the mounting portion 22' include a cushioning portion 38.

The cushioning portion 38 has a third knot density that is equal to the second knot density of the transition portion 28 or is preferably higher than the second knot density of the transition portion 28. In typical embodiments, the cushioning portion 38 has a single-layer design and includes a (1/1) or (2/2) Panama weave, for example. As a matter of course, the cushioning portion 38 may also include other weaves such as a (1/2) or (2/1) weave.

Preferably, the first knot density of the load portion 26 should amount to only 2% to 34% of the third knot density of the cushioning portion 38, to not more than 50% of the third knot density of the cushioning portion 38.

In particular, if the cushioning portion 38 is disposed in a direction of the load direction (B) adjacent to the load portion 26, the cushioning portion 38 can easily prevent combing out under load.

In the embodiment shown in FIG. 10, the load portion 26 is two-layered, wherein both layers have a (3/3) Panama weave. The cushioning portion 38, on the other hand, is formed by a single-layer (1/1) Panama weave. As a result, the first knot density of the load portion 26 amounts to only about 5% of the third knot density of the cushioning portion 38.

FIG. 11 illustrates a mounting area 22' which forms a partial area of a tensioning strap 44 of the airbag fabric 20 of the airbag 10.

In the shown embodiment, cushioning portions 38 are adjacent to three sides of the mounting area 22'. As a matter of course, such mounting area 22' can additionally include a cushioning portion 38 also on the right side in FIG. 11 so that the load portion 26 is surrounded frame-like by the cushioning portion 38. In this way, safe formation of a fiber bead can be assisted, for example, even for a load direction B which is not oriented in parallel or perpendicularly to the warp threads 32 and the weft threads 34, respectively.

The airbag fabric 20 moreover comprises, in the embodiment illustrated in FIGS. 9 to 11, a tolerance portion 40. Said tolerance portion 40 is formed by an inexpensive and simple weave and is introduced during manufacture to the airbag fabric in the area of the (laser) cutting lines 42 forming the edge of the airbag 10.

The size of the tolerance portion 40 is selected so that, even with consideration of the admissible tolerances when cutting the airbag 10, it can be guaranteed that the cushioning portion 38 will not be severed.

As a consequence, the embodiments of the mounting areas 22 shown in FIGS. 8 to 11 can prevent, specifically for very large airbags 10, that the mounting hole 24 of the mounting area 22 is not or not sufficiently adjacent to or is not surrounded by the load portion 26.

In this way, an airbag fabric 20 having a mounting area 22, 22' is provided which can absorb high loads and can be manufactured with little effort.

Furthermore, separate reinforcing elements can be dispensed with.

The invention is not limited to the illustrated embodiments. Specifically, individual features of one embodiment can be freely combined with features of other embodiments, in particular independently of the other features of the corresponding embodiments.

The invention claimed is:

1. An airbag fabric for an airbag comprising a mounting area for mounting the airbag,
    wherein the mounting area includes a mounting hole, a load portion which is adjacent to the mounting hole in a load direction, and a transition portion with is adjacent to the mounting hole against the load direction,
    wherein the load portion and the transition portion include different weaves and the fabric in the load portion exhibits lower resistance to displacement than in the transition portion so that a fiber bead forms of the fabric fibers of the load portion, the fiber bead being adjacent to the mounting hole in the load direction, if bearing stress acts upon the mounting hole in the load direction, wherein the airbag fabric is a one-piece-woven fabric in which the threads of opposite walls of an inflatable chamber at the edge merge into a joint weave.

2. The airbag fabric according to claim 1, wherein the weave of the load portion has a first knot density and the transition portion includes a weave having a second knot density, the first knot density being lower than the second knot density.

3. The airbag fabric according to claim 2, wherein the first knot density amounts to not more than 50% of the second knot density.

4. The airbag fabric according to claim 1, wherein the fabric of the load portion has a tear propagation resistance which amounts to at least 150% of the tear propagation resistance of the transition portion.

5. The airbag fabric according to claim 1, wherein the warp threads of the weave of the load portion extend perpendicularly or in parallel to the load direction.

6. The airbag fabric according to claim 1, wherein the weave of the load portion is a Panama weave.

7. The airbag fabric according to claim 1, wherein the transition portion merges into an airbag chamber portion which forms a wall of an inflatable chamber.

8. The airbag fabric according to claim 1, wherein the load portion is multi-layered, with the threads of the layers merging integrally into the weave of the transition portion.

9. The airbag fabric according to claim 1, wherein an edge portion is adjacent to the outside of the load portion, wherein the edge portion along with the transition portion frame-like surrounds the load portion, and wherein the edge portion and the transition portion include the same weave, and, if the load portion is multi-layered, the threads of the layers merge integrally into the weave of the transition portion and merge integrally into the single-layer weave of the edge portion.

10. The airbag fabric according to claim 1, wherein the load portion is multi-layered, wherein the threads of the layers merge integrally into the weave of the transition portion and, if an edge portion surrounds the load portion, merge integrally into the single-layer weave of the edge portion.

11. The airbag fabric according to claim 1, wherein the load portion has a base which tapers in the load direction.

12. The airbag fabric according to claim 1, wherein the load portion defines the edge of the mounting hole over a peripheral angle of at least 60°.

13. The airbag fabric for an airbag comprising a mounting area for mounting the airbag,
    wherein the mounting area includes a mounting hole which is disposed in a load portion, and a transition portion which is adjacent to the load portion toward an edge of the airbag,
    wherein the load portion and the transition portion include different weaves and the fabric in the load portion exhibits lower resistance to displacement than in the transition portion so that a fiber bead forms of the fabric fibers of the area of the load portion, which fiber bead is adjacent to the mounting hole in a load direction, if bearing stress acts upon the mounting hole in the load direction, wherein the airbag fabric is a one-piece-woven fabric in which the threads of opposite walls of an inflatable chamber at the edge merge into a joint weave.

14. The airbag fabric according to claim 13, wherein the weave of the load portion has a first knot density and the transition portion includes a weave having a second knot density, the first knot density being lower than the second knot density.

15. The airbag fabric according to claim 14, wherein the first knot density amounts to not more than 50% of the second knot density.

16. The airbag fabric according to claim 13, wherein the fabric of the load portion has a tear propagation resistance which amounts to at least 150% of the tear propagation resistance of the transition portion.

17. The airbag fabric according to claim 13, wherein the warp threads of the weave of the load portion extend perpendicularly or in parallel to the load direction.

18. The airbag fabric according to claim 13, wherein the weave of the load portion is a Panama weave.

19. The airbag fabric according to claim 13, wherein the transition portion merges into an airbag chamber portion which forms a wall of an inflatable chamber.

20. The airbag fabric according to claim 13, wherein the load portion is multi-layered, with the threads of the layers merging integrally into the weave of the transition portion.

21. The airbag fabric according to claim 13, wherein a cushioning portion is adjacent to the load portion.

22. The airbag fabric according to claim 21, wherein the cushioning portion is adjacent to the load portion at least in the load direction.

23. The airbag fabric according to claim 21, wherein a tolerance portion or the transition portion is adjacent to the cushioning portion, or in that the cushioning portion forms at least partially the transition portion and is adjacent to the walls of the airbag.

24. The airbag fabric according to claim 2, wherein the first knot density amounts to not more than 34% of the second knot density.

25. The airbag fabric according to claim 1, wherein the fabric of the load portion has a tear propagation resistance which amounts to at least 200% of the tear propagation resistance of the transition portion.

26. The airbag fabric according to claim 11, wherein the base of the load portion is in the form of a trapezoid, triangle, or circular segment.

27. The airbag fabric for an airbag comprising a mounting area for mounting the airbag,
   wherein the mounting area includes a mounting hole which is disposed in a load portion, and a transition portion which is adjacent to the load portion toward an edge of the airbag,
   wherein the load portion and the transition portion include different weaves and the fabric in the load portion exhibits lower resistance to displacement than in the transition portion so that a fiber bead forms of the fabric fibers of the area of the load portion, which fiber bead is adjacent to the mounting hole in a load direction, if bearing stress acts upon the mounting hole in the load direction, wherein a cushioning portion is adjacent to the load portion.

* * * * *